Feb. 14, 1967 M. R. KARECKI ETAL 3,303,711
SPEED CHANGE MECHANISM FOR BELT DRIVEN DEVICES
Filed Nov 2, 1964 3 Sheets-Sheet 1
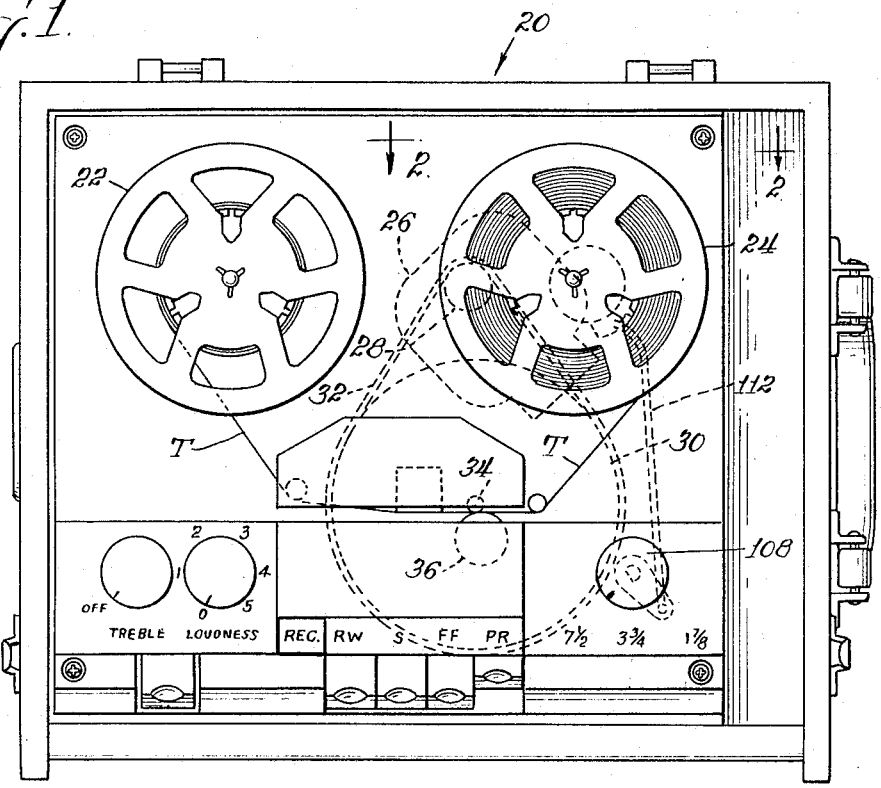
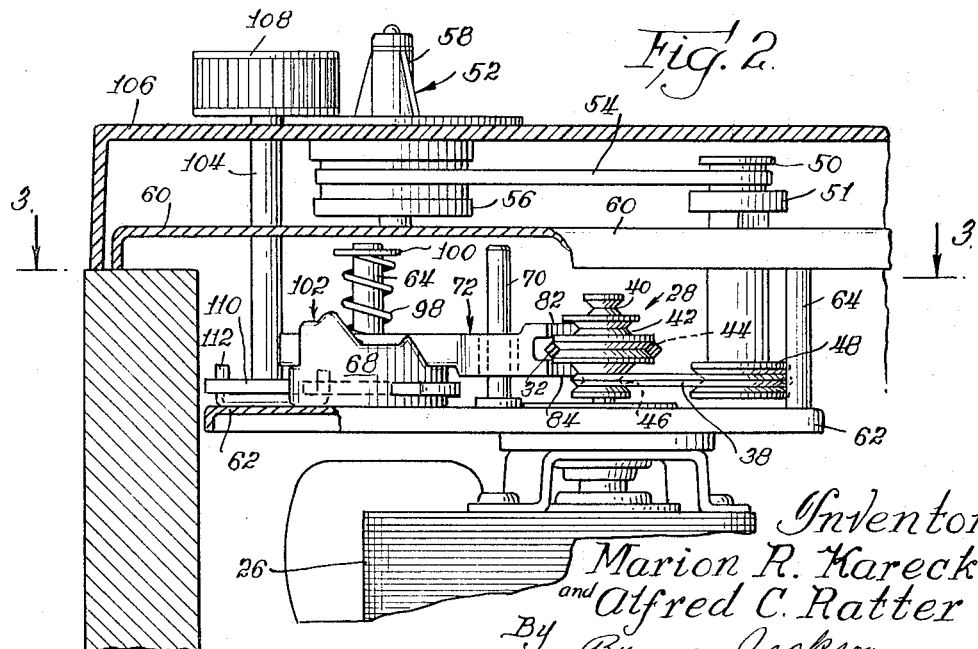
Inventors
Marion R. Karecki
and Alfred C. Ratter
By Brown, Jackson,
Boettcher & Dienner Att'ys.

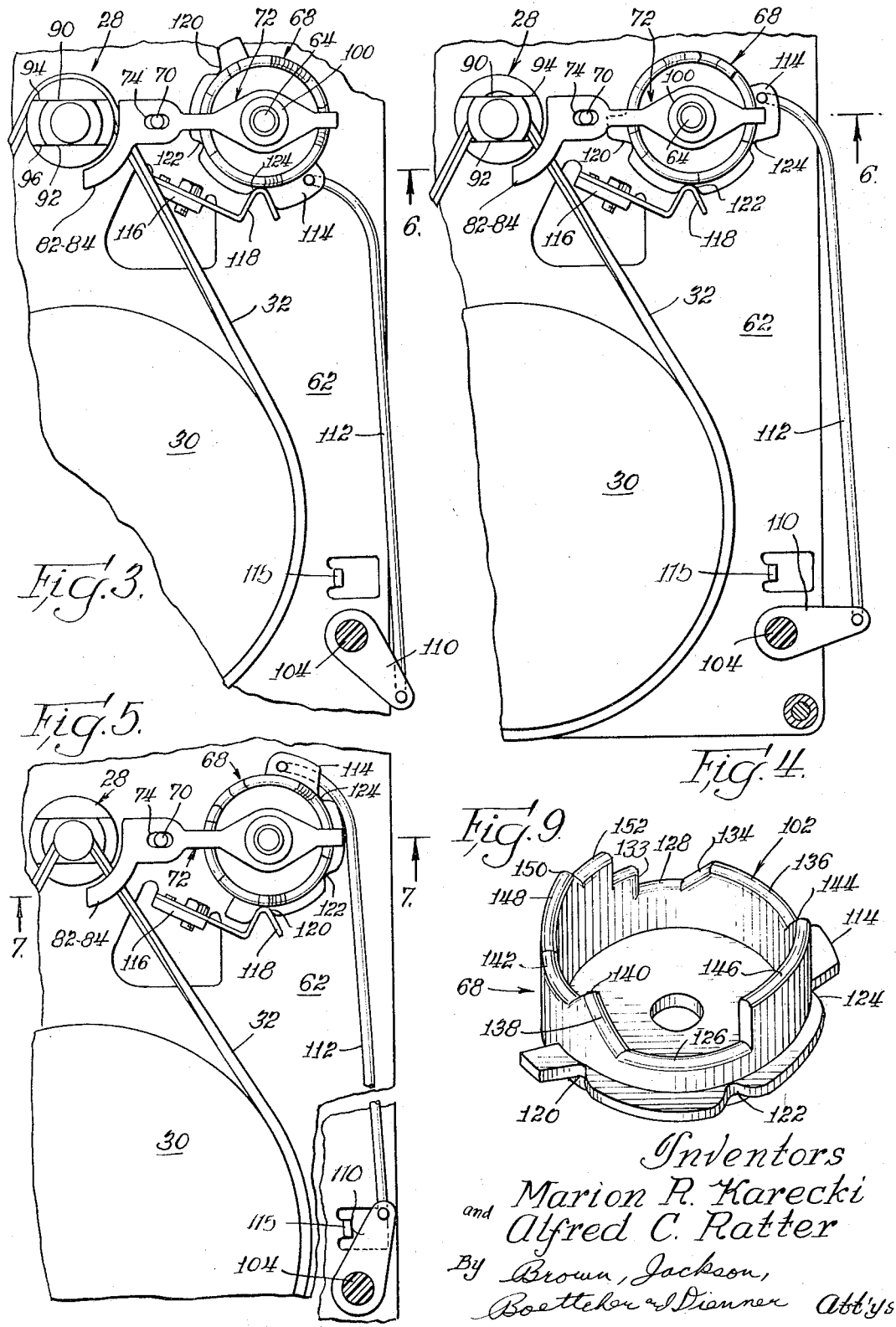

Feb. 14, 1967    M. R. KARECKI ETAL    3,303,711
SPEED CHANGE MECHANISM FOR BELT DRIVEN DEVICES
Filed Nov 2, 1964    3 Sheets-Sheet 3
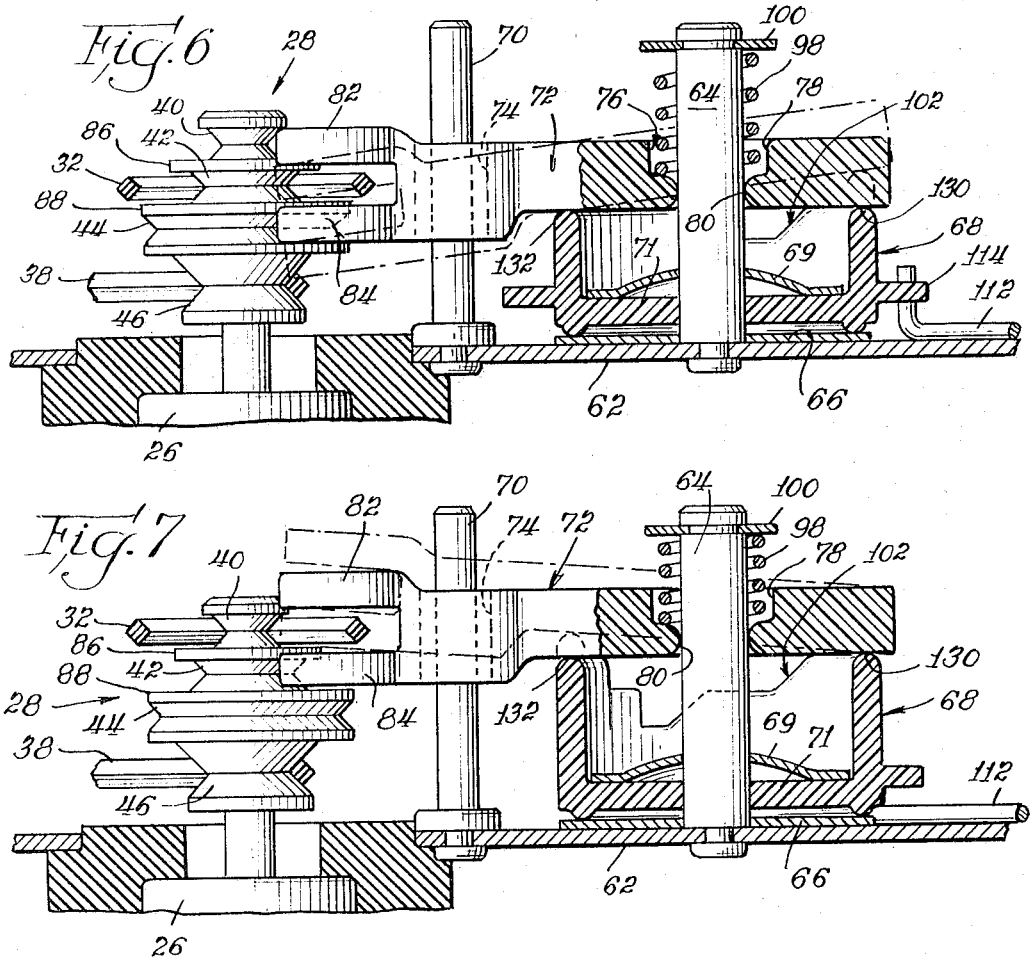
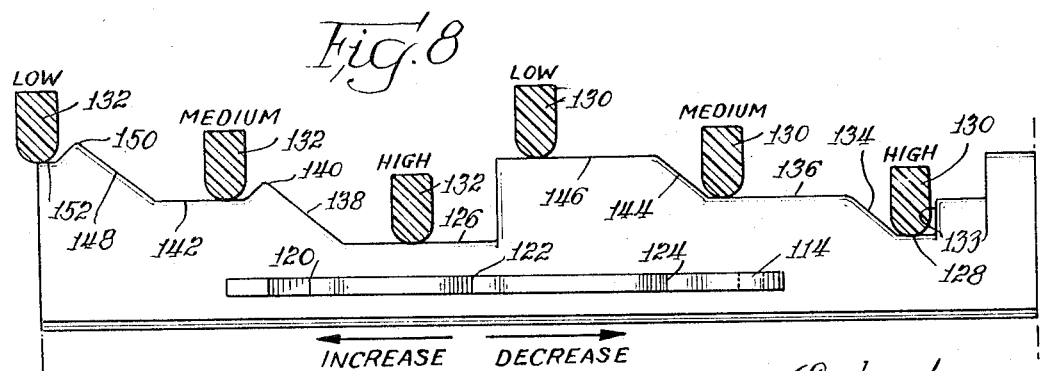
Inventors
Marion R. Karecki
and Alfred C. Ratter
By Brown, Jackson,
Boettcher & Dienner    Attys

United States Patent Office 3,303,711
Patented Feb. 14, 1967

3,303,711
SPEED CHANGE MECHANISM FOR BELT
DRIVEN DEVICES
Marion R. Karecki and Alfred C. Ratter, St. Joseph,
Mich., assignors to V-M Corporation, Benton Harbor,
Mich., a corporation of Michigan
Filed Nov. 2, 1964, Ser. No. 407,997
13 Claims. (Cl. 74—242.3)

The present invention relates to speed change mechanism for belt driven devices. More specifically, the invention relates to mechanisms having drive means including a stepped motor pulley and a drive belt thereon, and it relates to belt lifter mechanism for shifting the belt from one groove on the motor pulley to another groove thereon to change the drive speed. The invention is particularly suited for use in tape recorders to vary the speed at which tape is transported from one reel to another, but it is also applicable to various other mechanisms embodying variable speed drive means of the foregoing type.

It is known in the art to provide a tape recorder with drive means including a stepped motor pulley and an endless drive means including a stepped motor pulley and an endless drive belt which extends over the motor pulley and over a flywheel or other driven member which in turn rotates a capstan for feeding tape from one tape reel to another. It is further known to equip such recorders with speed change mechanism including belt lifter means for shifting the drive belt from one groove on the motor pulley to another groove having a different diameter in order to vary the tape speed. However, such known mechanisms are subject to certain disadvantages relative to their efficiency in the operation of shifting the belt from one groove to another on the motor pulley, and they are generally somewhat difficult to operate and not entirely reliable.

Accordingly, it is an object of the present invention to provide speed change mechanism for belt driven devices which is more efficient and more reliable in its operation than the mechanisms heretofore known.

A more specific object of the invention is to provide a speed change mechanism including belt lifter means which provides overtravel of the belt when shifting the same in either direction so as to assure that the belt is shifted to the desired groove on the motor pulley whether speed is being increased or decreased.

Still another object of the invention is to provide speed change mechanism of the type last above-mentioned wherein the actuating means for operating the belt lifter can be operated with a reduced amount of force, and wherein the total required stroke of the belt lifter is also reduced.

The foregoing and other objects and advantages of the invention will be apparent from the following description thereof.

Now in order to acquaint those skilled in the art with the manner of utilizing and practicing our invention, we shall describe in conjunction with the accompanying drawings, a preferred embodiment of the invention.

In the drawings:

FIGURE 1 is a top plan view of a tape recorder embodying the speed change mechanism of the present invention;

FIGURE 2 is an enlarged fragmentary vertical section, taken substantially along the line 2—2 of FIGURE 1, showing a stepped motor pulley, belt lifter means, and a rotary cam and related mechanism for actuating the belt lifter means;

FIGURE 3 is a fragmentary horizontal sectional view, taken substantially along the line 3—3 of FIGURE 2, showing the rotary cam for actuating the belt lifter, and showing a crank and rod mechanism for rotating the cam in order to change the speed of the drive, the mechanism being shown in its maximum speed position wherein the belt is disposed on the largest of three grooves on the motor pulley;

FIGURE 4 is a view similar to FIGURE 3 showing the speed change mechanism in an intermediate speed position wherein the belt is disposed on the middle one of the three motor pulley grooves;

FIGURE 5 is a further view similar to FIGURE 3 showing the speed change mechanism in a low speed position wherein the belt is disposed on the smallest of the three motor pulley grooves;

FIGURE 6 is an enlarged fragmentary vertical section, taken substantially along the line 6—6 of FIGURE 4, showing the belt lifter member in solid lines in the intermediate speed drive position wherein the belt is disposed on the intermediate pulley groove, and further showing the belt lifter in dash lines to indicate its overtravel position as the belt is being shifted from the uppermost pulley groove to the intermediate pulley groove;

FIGURE 7 is an enlarged fragmentary vertical section, taken substantially along the line 7—7 of FIGURE 5, showing the belt lifter member in solid lines in the slow speed drive position wherein the belt is disposed on the uppermost small diameter pulley groove, and further showing the belt lifter in dash lines to indicate its overtravel position as the belt is being shifted from the intermediate pulley groove to the uppermost pulley groove;

FIGURE 8 is a developed view of the rotary actuating cam which controls the position of the belt lifter member; and FIGURE 9 is a perspective view of the rotary actuating cam.

Referring now to the drawings, FIGURE 1 shows a tape recorder 20 having left and right hand tape reels 22 and 24 having a length of tape T wound thereon. There is further shown a motor 26, a stepped motor pulley 28, a flywheel 30 and an endless flywheel drive belt 32 which extends over the motor pulley 28 and the flywheel 30 thereby causing the flywheel to be driven by the motor pulley. A capstan 34 is fixed to the flywheel 30 in coaxial relation therewith and thus rotates with the flywheel to drive the tape T which is held against the capstan by a releasable pressure roller 36. A second endless belt, shown at 38 in FIGURE 6 is disposed on the motor pulley 28 and drives other mechanism to be described in part hereinafter which rotates the reels 22 and 24, the reel 22 being driven in a clockwise direction when tape is being wound thereon, and the reel 24 being driven in a counterclockwise direction when tape is being wound thereon.

The present invention relates to mechanism for changing the speed at which the flywheel 30 is driven by the motor pulley 28, and such control is effected by shifting the position of flywheel drive belt 32 with respect to the stepped motor pulley 28. As shown in FIGURES 2, 6 and 7, the motor pulley 28 is provided with four V-shaped drive grooves 40, 42, 44 and 46. The lowermost drive groove 46 has the endless belt 38 disposed therein and, as best shown in FIGURE 2, the belt 38 drives a pulley 48 which is mounted on the same vertical shaft as a pulley 50 so as to rotate the latter. The pulley 50 drives a reel hub 52 by means of an endless belt 54, the reel hub including a lower pulley portion 56 and an upper hub portion 58. The right hand tape reel 24 is mounted on the hub portion 58 and thus is driven from the motor pulley 28 by the above-described mechanism. It should be understood that the belt 54 is normally sufficiently loose as to be inoperative, and belt tightening mechanism (not shown) is provided to render the belt 54 operative when it is desired to rotate the right hand tape reel 24 in a counterclockwise direction as during playing or recording. The left hand reel 22 is driven from a drive surface 51 on the pulley 50 by suitable drive mechanism (not shown). The endless belt 38 is never shifted relative to the stepped motor pulley 28 and thus is not a component of the speed change mechanism to be described hereinbelow.

The three V-shaped grooves 40, 42 and 44 are of different diameters, and the endless belt 32 is shifted vertically to a selected one of these grooves in order to select a desired drive speed for the flywheel 30, the speed of the flywheel being determinative of the speed of the tape T as previously described. The uppermost pulley groove 40 is the smallest in diameter, and when the belt 32 is disposed in the groove 40 the flywheel 30 and tape T will be driven at slow speed. The middle pulley groove 42 comprises an intermediate diameter drive groove, and when the belt 32 is disposed in the groove 42 the flywheel 30 and tape T will be driven at an intermediate speed. In a similar fashion, the lowermost pulley groove 44 comprises a large diameter drive groove, and when the belt 32 is disposed in the groove 44 the flywheel 30 and tape T will be driven at high speed. Thus, the tape recorder 20 described herein provides three speeds at which the tape can be driven when being transported from the left hand reel 22 to the right hand reel 24 as during playing or recording.

The mechanism for shifting the belt 32 from one V-groove to another on the motor pulley 28 will now be described. FIGURE 2 shows a main baseplate 60, and a subplate 62 is fixedly supported beneath the baseplate 60 by means of a plurality of depending rods such as shown at 64. Referring to FIGURES 6 and 7, a cam shaft 64 is fixedly secured to the subplate 62 and extends upwardly therefrom. A cam washer 66 is mounted over the shaft 64 and disposed on top of the subplate 62, and a rotary speed change cam 68 is mounted over the shaft 64 so as to rest on the top of the washer 66, the cam being rotatable about the shaft 64. A pushnut 69 is pressed over the shaft 64 so as to bear against a base 71 of the cam 68 and thereby stabilize the rotatable cam. Spaced from the cam shaft 64 toward the stepped pulley 28 is a guide rod 70 which is also fixedly secured to the subplate 62 at its lower end and extends upwardly therefrom to approximately the same height as the cam shaft.

A belt lifter 72 is disposed on the cam shaft 64 and guide rod 70 for vertical movement thereon. The belt lifter 72 is provided with an oblong slot 74 (see FIGURES 3-5) through which the guide rod 70 extends. The slot 74 extends longitudinally relative to the lifter, and the width of the slot is only slightly greater than the diameter of the guide rod 70, while the length thereof is significantly greater than the rod diameter. Consequently, the rod 70 prevents transverse movement of the adjacent end of the lifter, and yet the lifter can be pivoted relative to the guide rod as indicated by the dash line positions of the lifter in FIGURES 6 and 7.

The belt lifter 72 is further provided with an opening 76 through which the cam shaft 64 projects. The opening 76 comprises an upper large diameter portion 78 which is substantially greater than the diameter of the cam shaft 64, and at its lower end there is an annular rim 80 which is only slightly greater in diameter than the cam shaft 64 so as to prevent any substantial movement of the adjacent end of the belt lifter 72 in a horizontal plane. However, the internal annular rim 80 is formed with a radius which facilitates tilting of the belt lifter 72 relative to the cam shaft 64 as shown by the dash line positions of FIGURES 6 and 7.

The belt lifter 72 is movable vertically on the cam shaft 64 and guide rod 70 in order to shift the drive belt 32 from one groove on the stepped motor pulley 28 to another groove thereon. The belt lifter 72 has a pair of arms 82 and 84 which are vertically spaced apart an amount sufficient to permit the belt 32 to pass therebetween without engaging the arms, and as viewed in FIGURE 3 the arms extend arcuately across the path of the belt, the arms being proximate the stepped pulley 28. It will now be understod that when the belt lifter 72 is moved upwardly, it will lift the belt 32 and cause the belt to be shifted upwardly to a smaller diameter groove on the stepped pulley 28 so as to reduce the speed of the tape T. Similarly, when it is desired to increase the speed of the tape, the belt lifter 72 is moved downwardly so as to shift the belt 32 downwardly to a larger diameter groove on the stepped pulley. FIGURE 6 shows a rim 86 on the pulley 28 between the upper groove 40 and the middle groove 42, and a second rim 88 between the middle groove 42 and the lower groove 44. Opposed flats are formed on both of these rims as shown at 90 and 92 in FIGURE 3 for the rim 86, and at 94 and 96 for the rim 88. When the belt 32 is being shifted from one groove to another on the stepped pulley 28, the flats catch on the belt and assist in the shifting thereof, as in conventional in the art.

The belt lifter 72 is disposed on the top of the rotary cam 68 and is biased downwardly against the cam by a compression spring 98. The lower end of the spring 98 extends into the opening 78 and seats against the upper portion of the annular rim 80, and the upper end of the spring is retained by a retaining ring 100 which is fixedly mounted at the top of the cam shaft 64. The top of the cam 68 has formed thereon a cam surface indicated generally at 102. The cam 68, as previously indicated, is a rotary cam, and the cam surface 102 defines substantially a full circle. Thus, the cam 68 acts upon the belt lifter 72 in two different contact areas on opposite sides of the cam shaft 64. Since diametrically opposed portions of the cam surface 102 are not always of the same configuration and height, the lifter 72 is caused to tilt in certain positions of the cam 68, as will be explained more fully hereinafter.

FIGURE 2 shows a speed selector shaft 104 which is mounted at its lower end on the subplate 62 and extends upwardly through the baseplate 60 and through an upper housing member 106. The selector shaft 104 is rotatable, and a knob 108 is mounted at the upper end of the shaft to facilitate manual rotation thereof. Referring now to FIGURE 3, it will be seen that a crank arm 110 is affixed to the lower end of the shaft 104 for rotation therewith, the arm 110 being disposed proximate the upper surface of the subplate 62. A rod 112 has one end connected to the crank arm 110 and its other end connected with a lug 114 formed on the side of the cam 68. The cam 68 will itself be described in detail later herein, but it will here be noted that when the selector shaft 104 and crank arm 110 are in the position of FIGURE 3, the rotary position of the cam 68 is such that the belt lifter 72 is in its lowermost position. Consequently, the belt 32 will be disposed in the large diameter pulley groove 44 so as to drive the tape T at high speed. When the selector shaft 104 and crank arm 110 are manually rotated to the position of FIGURE 4, the rotary position of the cam 68 is such that the belt lifter 72 is in its intermediate position, and the belt 32 will be disposed in the middle intermediate diameter pulley groove 42 so as to drive the tape T at an intermediate speed. Similarly, when the selector shaft 104 and crank arm 110 are manually rotated to the position of FIGURE 5, the rotary position of the cam 68 is such that the belt lifter 72 is in its uppermost position, and the belt 32 will be disposed in the upper small diameter pulley groove 40 so as to drive the tape T at slow speed. It will be noted that in the FIGURE 5 position the crank arm 110 engages a fixed stop 115 which prevents overtravel of the arm and also of the cam 68 in the counterclockwise direction.

It will now be understood that the tape speed is controlled by manual rotation of the control knob 108 to a selected one of three positions, and such movement of the knob 108 effects rotation of the cam 68 which in turn controls the vertical position of the belt lifter member 72. The subplate 62 has an upright tab 116 formed thereon, and a V-shaped detent spring 118 is secured to the tab 116 and positioned so as to bear against the periphery of the rotary cam 68. Three notches 120, 122 and 124 are formed in the periphery of the cam and are spaced apart approximately 68 degrees, and the nose of the detent spring 118 projects into such notches so as to provide three detent positions for the cam, one for each of the three tape speeds provided.

Reference is now made to FIGURES 8 and 9 which illustrate the rotary cam 68, and in particular the cam surface 102 which extends for substantially a full circle and is arranged as previously described so that the belt lifter 72 extends diametrically across the cam and engages diametrically opposed portions of the cam surface 102. A first level on the cam 68 comprises the flat dwell surfaces 126 and 128, and as best shown in FIGURE 8, these surfaces are of the same height, although the dwell surface 126 is of a greater arcuate length. As shown in FIGURE 6, the lifter 72 is engaged at its underside by the cam 68 at two areas, one being at the rear end of the lifter indicated at 130, and the other being a forward area at the opposite side of the shaft 64 as indicated at 132. When the cam 68 is rotated to the high speed position of FIGURE 3 to dispose the belt 32 in the lowermost pulley groove 44, the relative position of the cam and the lifter 72 is such that the rear lifter contact area 130 will be disposed on the flat cam surface 128, and the forward lifter contact area 132 will be disposed on the flat cam surface 126 (see FIGURE 8). In the latter positions of the components, the belt lifter 72 will be horizontally disposed at its lowermost level, and the lifter arms 82 and 84 will straddle the belt 32 in spaced relation to the belt running in the pulley groove 44. A stop 133 formed on the cam 68 cooperates with the rear end of the lifter 72 to prevent overtravel of the cam in the clockwise direction.

If it is desired to decrease the speed of the tape T to the intermediate speed, the cam 68 is rotated in a counterclockwise direction to the position of FIGURE 4, and as shown in the developed view of FIGURE 8, the cam is moved to the right. As the cam 68 starts to turn, an inclined cam surface 134 engages the rear lifter contact area 130, while the forward lifter contact area 132 is still riding on the flat dwell surface 126. Accordingly, the belt lifter 72 is tilted with its rear end disposed upwardly generally as indicated in dash lines in FIGURE 6 (FIGURE 6 is referred to only to indicate the tilting of the lifter, since a different lifter height is shown), such tilting of the lifter occurring approximately about the cam surface 126. The rear end of the belt lifter 72 thus rides up to the flat intermediate cam dwell surface 136, and thereafter the forward lifter contact area 132 rides up an incline 138, moves up over a hump 140, and then falls back down on a flat dwell surface 142. The dwell surface 142 is at the same height as the dwell surface 136, and in the medium speed position of the cam 68 the approximate positions of the lifter contact areas 130 and 132 relative to the cam are shown in FIGURE 8.

The medium speed position of the cam 68 is shown in FIGURE 4, and in this position the belt lifter 72 will be horizontally disposed at its intermediate level as shown in solid lines in FIGURE 6, and the lifter arms 82 and 84 will straddle the belt 32 in spaced relation to the belt which will have been shifted to the middle pulley groove 42. However, while the belt lifter will be horizontally disposed in the intermediate drive position, it is important to note that as the forward lifter contact area 132 passes over the hump 140, the forward end of the belt lifter will be tilted upwardly, as generally shown by the dash line overtravel position of FIGURE 7 (FIGURE 7 is referred to only to indicate the tilting of the lifter, since a different lifter height is depicted). Such tilting of the lifter will occur approximately about the cam dwell surface 136. Accordingly, due to such a tilting or rocking action, the belt 32 will first be shifted upwardly beyond the intermediate position by the lifter arms 82 and 84, and thereafter the lifter arms will return to the normal intermediate position. The overtravel provided assures that the belt 32 will be properly lifted upwardly to the intermediate pulley groove 42.

When it is desired to decrease the speed of the tape T to slow speed, the cam 68 is further rotated in the counterclockwise direction to the position of FIGURE 5, and thus the cam is moved further to the right as viewed in FIGURE 8. As the cam 68 starts to turn, an inclined cam surface 144 will engage the rear lifter contact area 130 while the forward lifter contact area 132 is still riding on the flat dwell surface 142, thus tilting the lifter about the surface 142 to raise the rear end of the lifter. The rear end of the belt lifter rides up to the upper flat cam dwell surface 146, and thereafter the forward lifter contact area 132 rides up an incline 148, moves over a hump 150, and then falls back down on a flat dwell surface 152. The dwell surface 152 is at the same height as the surface 146, and in the low speed position of the cam 68, the approximate position of the lifter contact areas 130 and 132 relative to the cam are shown in FIGURE 8.

The low speed position of the cam 68 is shown in FIGURE 5, and in this position the belt lifter 72 will be horizontally disposed at its uppermost level as shown in solid lines in FIGURE 7, with the lifter arms 82 and 84 straddling the belt 32 in spaced relation to the belt which will have been shifted to the upper pulley groove 40. It will be noted however that when the forward lifter contact area 132 passes over the hump 150, the forward end of the lifter will be tilted upwardly as shown in dash lines in FIGURE 7, thereby providing overtravel of the belt 32 to assure that the belt is lifted to the upper pulley groove 40.

In order to increase the tape speed from low speed to medium speed, the cam 68 is rotated in a clockwise direction from the position of FIGURE 5 to the position of FIGURE 4, and thus as shown in the developed view of FIGURE 8 the cam is moved to the left. As the cam starts to rotate, the hump 150 moves under the lifter contact area 132 and tilts the forward end of the lifter upwardly as shown in dash lines in FIGURE 7, and then the forward lifter contact area 132 rides down the inclined cam surface 148 to the flat dwell surface 142, while the rear lifter contact area 130 is still disposed on the upper flat dwell surface 146. Accordingly, the forward end of the belt lifter 72 is tilted downwardly to the position shown in dash lines in FIGURE 6, thus providing overtravel of the downwardly shifting belt 32 to assure that the belt is shifted to the intermediate pulley groove 42. Thereafter, the rear lifter contact area 130 rides down the inclined cam surface 144 to the flat intermediate dwell surface 136 thereby causing the lifter to be horizontally disposed at its intermediate level as shown in solid lines in FIGURE 6.

It will be understood from the foregoing that the speed change mechanism of the present invention provides overtravel of the belt 32 in both directions, i.e., whether the belt is being shifted upwardly to decrease tape speed or downwardly to increase tape speed. When the belt lifter 72 is being moved upwardly to decrease tape speed, the overtravel is provided by the humps 140 and 150 which act upon the forward lifter contact area 132 to tilt the forward end of the lifter upwardly above the height of the pulley groove to which the belt is being lifted, while the rear end of the lifter is not moved above such height. When the belt lifter 72 is being moved downwardly to increase tape speed, the overtravel is provided due to the unsymmetrical nature of the rotary cam 68 which permits the forward end of the lifter to tilt downwardly before the rear end of the lifter is moved down to the desired level, and such tilting action temporarily causes the forward end of the lifter to move below the height of the pulley groove to which the belt is being lowered.

When overtravel is being provided, the belt lifter 72 is tilting or rocking about a pivot located approximately at the rear lifter contact area 130, and such tilting action reduces the stroke which is required of the lifter to provide the desired overtravel. That is, by tilting the forward end of the lifter upwardly or downwardly about a pivot located approximately at the rear lifter contact area 130 in order to provide overtravel in either direction, it is possible to reduce the height of the cam shaft 64, and it is also possible to reduce the cam heights as well as the amount of force required to actuate the cam. The belt lifter 72 is in a horizontal position only when it is in one of the three drive positions as represented by the cam positions of FIGURES 3, 4 and 5, and in all other positions of the cam 68 the lifter is rocking or tilting about one of the lifter cam contact areas. In the particular embodiment described, the stepped pulley drive grooves 40, 42 and 44 are vertically spaced apart 0.156 inch, the belt lifter 72 is shifted vertically 0.156 inch when moved from one speed position to the next speed position, and the amount of overtravel provided in both directions is 0.078 inch.

While we have described our invention in a preferred form, we do not intend to be limited to such form, except insofar as the appended claims are so limited, since modifications within the scope of our invention will readily occur to others, particularly with our disclosure before them.

We claim:

1. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and engageable with said belt for shifting the same from one of said belt grooves to another, guide means along which said belt lifter means is movable when shifting said belt, and movable cam means having two cam surface portions in engagement with said belt lifter means at respective spaced contact areas to move said belt lifter means along said guide means and control the orientation of said belt lifter means, said two cam surface portions having configurations different from one another to provide tilting of said belt lifter means as the latter is moved along said guide means.

2. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and having an operative end engageable with said belt for shifting the same from one of said belt grooves to another, guide means along which said belt lifter means is movable when shifting said belt, said belt lifter means being movable in a first direction along said guide means to decrease said speed and in a second opposite direction along said guide means to increase said speed, and movable cam means having two cam surface portions in engagement with said belt lifter means at respective first and second contact areas spaced along the length of said belt lifter means to move the latter along said guide means and control the orientation of said belt lifter means, said two cam surface portions having configurations different from one another to provide tilting of said belt lifter means as the latter is moved along said guide means.

3. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and having an operative end engageable with said belt for shifting the same from one of said belt grooves to another, guide means along which said belt lifter means is movable when shifting said belt, said belt lifter means being movable in a first direction along said guide means to decrease said speed and in a second opposite direction along said guide means to increase said speed, movable cam means having two cam surface portions in engagement with said belt lifter means at respective first and second contact areas spaced along the length of said belt lifter means to move the latter in one of said first and second directions along said guide means and control the orientation of said belt lifter means, said two cam surface portions having configurations different from one another to provide tilting of said belt lifter means as the latter is moved along said guide means, and spring means biasing said belt lifter means against said cam means for moving said belt lifter means in the other of said first and second directions along said guide means.

4. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and having an operative end engageable with said belt for shifting the same from one of said belt grooves to another, said belt lifter means being movable between different drive position levels each level being in alignment with a corresponding one of said belt grooves, guide means along which said belt lifter means is movable when shifting said belt, said belt lifter means being movable in a first direction along said guide means to decrease said speed and in a second opposite direction along said guide means to increase said speed, and movable cam means having two cam surface portions in engagement with said belt lifter means at respective first and second contact areas spaced along the length of said belt lifter means to control movement of the latter along said guide means and control the orientation of said belt lifter means, said first contact area being closer to said operative end than said second contact area, said two cam surface portions having configurations different from one another including respective inclined cam surfaces offset from one another including respective inclined cam surfaces offset from one another so that when moving said belt lifter means from a first one of said levels to a second one of said levels said first contact area will be moved to said second level before said second contact area thereby tilting said belt lifter means and providing overtravel at said operative end, and one of said cam surface portions having hump means operative when moving said belt lifter means from said second level to said first level to temporarily move said first contact area beyond said first level and then back to said first level thereby again tilting said belt lifter means and providing overtravel at said operative end.

5. The invention of claim 4 wherein said cam means moves said belt lifter means in one of said first and second directions along said guide means, and spring means biasing said belt lifter means against said cam means for moving said belt lifter in the other of said first and second directions along said guide means.

6. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and engageable with said belt for shifting the same from one of said belt grooves to another, guide means along which said belt lifter means is movable when shifting said belt, and rotary cam means having a generally circular cam surface comprising two cam surface portions in engagement with said belt lifter means at respective spaced contact areas to move said belt lifter means along said guide means and control the orientation of said belt lifter means, said belt lifter means being disposed generally diametrically across said circular cam surface, and said two cam surface portions having configurations different from one another to provide tilting of said belt lifter means as the latter is moved along said guide means.

7. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and having an operative end engageable with said belt for shifting the same from one of said belt grooves to another, guide means along which said belt lifter means is movable when shifting said belt, said belt lifter means being movable in a first direction along said guide means to decrease said speed and in a second opposite direction along said guide means to increase said speed, and rotary cam means having a generally circular cam surface comprising two cam surface portions in engagement with said belt lifter means at respective first and second contact areas spaced along the length of said belt lifter means to move the latter along said guide means and control the orientation of said belt lifter means, said belt lifter means being disposed generally diametrically across said circular cam surface, and said two cam surface portions having configurations different from one another to provide tilting of said belt lifter means as the latter is moved along said guide means.

8. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and having an operative end engageable with said belt for shifting the same from one of said belt grooves to another, guide means along which said belt lifter means is movable when shifting said belt, said belt lifter means being movable in a first direction along said guide means to decrease said speed and in a second opposite direction along said guide means to increase said speed, rotary cam means having a generally circular cam surface comprising two cam surface portions in engagement with said belt lifter means at respective first and second contact areas spaced along the length of said belt lifter means to move the latter in one of said first and second directions along said guide means and control the orientation of said belt lifter means, said belt lifter means being disposed generally diametrically across said circular cam surface, and said two cam surface portions having configurations different from one another to provide tilting of said belt lifter means as the latter is moved along said guide means, and spring means biasing said belt lifter means against said cam means for moving said belt lifter means in the other of said first and second directions along said guide means.

9. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, belt lifter means movable in a direction generally parallel to said motor pulley axis and having an operative end engageable with said belt for shifting the same from one of said belt grooves to another, said belt lifter means being movable between different drive position levels each level being in alignment with a corresponding one of said belt grooves, guide means along which said belt lifter means is movable when shifting said belt, said belt lifter means being movable in a first direction along said guide means to decrease said speed and in a second opposite direction along said guide means to increase said speed, and rotary cam means having a generally circular cam surface comprising two cam surface portions in engagement with said belt lifter means at respective first and second contact areas spaced along the length of said belt lifter means to control movement of the latter along said guide means and control the orientation of said belt lifter means, said belt lifter means being disposed generally diametrically across said circular cam surface with said first contact area being closer to said operative end than said second contact area, said two cam surface portions having configurations different from one another including respective inclined cam surfaces offset from one another so that when moving said belt lifter means from a first one of said levels to a second one of said levels said first contact area will be moved to said second level before said second contact area thereby tilting said belt lifter means and providing over-travel at said operative end, and one of said cam surface portions having hump means operative when moving said belt lifter means from said second level to said first level to temporarily move said first contact area beyond said first level and then back to said first level thereby again tilting said belt lifter means and providing overtravel at said operative end.

10. The invention of claim 9 wherein said cam means moves said belt lifter means in one of said first and second directions along said guide means, and spring means biasing said belt lifter means against said cam means for moving said belt lifter means in the other of said first and second directions along said guide means.

11. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, a pair of fixed spaced apart rods extending generally parallel to said motor pulley axis, belt lifter means slidable on said rods along the lengths thereof and having an operative end engageable with said belt for shifting the same from one of said belt grooves to another, said belt lifter means being movable in a first direction along said rods to decrease said speed and in a second opposite direction along said rods to increase said speed, and movable cam means having two cam surface portions in engagement with said belt lifter means at respective first and second contact areas spaced along the length of said belt lifter means to move the latter along said rods and control the orientation of said belt lifter means, said two cam surface porions having configurations different from one another to provide tilting of said belt lifter means as the latter is moved along said rods.

12. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, first and second fixed spaced apart rods extending generally parallel to said motor pulley axis, said first of said rods being closer to said motor pulley than the second of said rods, belt lifter means slidable on said rods along the lengths thereof and having an operative end engageable with said belt for shifting the same from one of said belt grooves to another, said belt lifter means being movable in a first direction along said rods to decrease said speed and in a second opposite direction along said rods to increase said speed, and rotary cam means rotatably mounted on the second of said rods and having a generally circular cam surface comprising two cam surface portions in engagement with said belt lifter means at respective first and second contact areas spaced along the length of said belt lifter means to move the latter along said rods and contact the orientation of said belt lifter means, said belt lifter means being disposed generally diametrically across said circular cam surface, and said two cam surface portions having configurations different from one another to provide tilting of said belt lifter means as the latter is moved along said rods.

13. In a belt driven device of the type having a stepped motor pulley with a plurality of belt grooves of different diameters spaced along the axis of said pulley, a driven member, and an endless belt extended over the stepped motor pulley and driven member for driving the latter from the motor pulley at a speed determined by the diameter of the groove in which the belt is located, the improvement comprising speed change mechanism including, in combination, first and second fixed spaced apart rods extending generally parallel to said motor pulley axis, said first of said rods being closer to said motor pulley than the second of said rods, belt lifter means slidable on said rods along the lengths thereof and having an operative end engageable with said belt for shifting the same from one of said belt grooves to another, said belt lifter means being movable between different drive position levels each level being in alignment with a corresponding one of said belt grooves, said belt lifter means being movable in a first direction along said rods to decrease said speed and in a second opposition direction along said rods to increase said speed, and rotary cam means rotatably mounted on the second of said rods and having a generally circular cam surface comprising two cam surface portions in engagement with said belt lifter means at respective first and second contact areas spaced along the length of said belt lifter means to control movement of the latter along said rods and control the orientation of said belt lifter means, said belt lifter means being disposed generally diametrically across said circular cam surface with said first contact area being closer to said operative end than said second contact area, said two cam surface portions having configurations different from one another including respective inclined cam surfaces offset from one another so that when moving said belt lifter means from a first one of said levels to a second one of said levels said first contact area will be moved to said second level before said second contact area thereby tilting said belt lifter means and providing overtravel at said operative end, and one of said cam surface portions having hump means operative when moving said belt lifter means from said second level to said first level to temporarily move said first contact area beyond said first level and then back to said first level thereby again tilting said belt lifter means and providing overtravel at said operative end.

References Cited by the Examiner

UNITED STATES PATENTS

| | | | |
|---|---|---|---|
| 971,219 | 9/1910 | Schatz | 74—242.3 X |
| 1,025,868 | 5/1912 | Gridley | 74—242.3 |
| 1,252,350 | 1/1918 | Knight | 74—242.4 |
| 3,108,486 | 10/1963 | Azzolari | 74—242 |
| 3,248,961 | 5/1966 | Bortzfield et al. | 74—242.3 |

FOREIGN PATENTS

| | | |
|---|---|---|
| 374,613 | 6/1932 | Great Britain. |

DAVID J. WILLIAMOWSKY, *Primary Examiner.*

J. A. WONG, *Assistant Examiner.*